United States Patent
Zhang et al.

(10) Patent No.: US 8,768,328 B2
(45) Date of Patent: Jul. 1, 2014

(54) SWITCHING METHOD AND SYSTEM OF MULTIPLE INPUT MULTIPLE OUTPUT MODE

(75) Inventors: Yu Zhang, Shenzhen (CN); Xiang Cheng, Shenzhen (CN); Lin Liu, Shenzhen (CN); Shugong Lin, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/698,973

(22) PCT Filed: Dec. 31, 2010

(86) PCT No.: PCT/CN2010/080650
§ 371 (c)(1),
(2), (4) Date: Nov. 19, 2012

(87) PCT Pub. No.: WO2011/147186
PCT Pub. Date: Dec. 1, 2011

(65) Prior Publication Data
US 2013/0072179 A1    Mar. 21, 2013

(30) Foreign Application Priority Data
May 26, 2010 (CN) .......................... 2010 1 0189437

(51) Int. Cl.
*H04B 1/26* (2006.01)
*H04W 36/00* (2009.01)
*H04W 4/00* (2009.01)

(52) U.S. Cl.
USPC ............ 455/418; 455/436; 370/328; 370/338

(58) Field of Classification Search
USPC ........................ 455/418, 436; 370/328, 338
See application file for complete search history.

(56) References Cited

U.S. PATENT DOCUMENTS

2010/0118784 A1* 5/2010 Goransson et al. ........... 370/328

FOREIGN PATENT DOCUMENTS

| CN | 101431778 A | 5/2009 |
|----|-------------|--------|
| CN | 101518129 A | 8/2009 |
| CN | 101562904 A | 10/2009 |
| CN | 101572573 A | 11/2009 |
| CN | 101640915 A | 2/2010 |

OTHER PUBLICATIONS

International Search Report (Form PCT/ISA/210) for PCT/CN2010/080650, mailed Apr. 7, 2011.

* cited by examiner

*Primary Examiner* — Omoniyi Obayanju
(74) *Attorney, Agent, or Firm* — Koppel, Patrick, Heybl & Philpott

(57) ABSTRACT

A switching method and system for a Multiple Input Multiple Output (MIMO) mode are provided by the disclosure. The method comprises that: a NodeB determines to perform MIMO mode switching for a cell (S302); through a NodeB Application Part (NBAP) layer of an Iub port, the NodeB sends a message which carries the cell identifier of the cell and the MIMO mode status information of the cell (S304) to a Radio Network Controller (RNC); the RNC updates the MIMO mode status of the cell by using the cell identifier and the MIMO mode status information (S306). The disclosure ensures normal communication between a piece of User Equipment (UE) and a NodeB.

14 Claims, 6 Drawing Sheets

SWITCHING METHOD AND SYSTEM OF MULTIPLE INPUT MULTIPLE OUTPUT MODE

FIELD OF THE INVENTION

The disclosure relates to the field of radio communication, and more particularly to a switching method and a system of the Multiple Input Multiple Output (MIMO) mode.

BACKGROUND OF THE INVENTION

With the continuous development of communication technologies, the requirement on the rate of data transmission is becoming higher and higher. Therefore, the High Speed Downlink Packet Access (HSDPA) technology is introduced in the 3rd Generation Partnership Project (3GPP) R5, and a next generation evolution technology: the Evolved High-Speed Packet Access (HSPA+) is further provided. Compared with HSDPA, HSPA+ introduces two key technologies, one of which is the MIMO technology which is able to multiply the capacity and the spectrum efficiency of communication systems without increasing bandwidths. After the introduction of MIMO, the peak rate of a cell and a single user is 28.8 Mbps in the case of MIMO with 16 QAM, and is 43.2 Mbps in the case of MIMO with 64 QAM.

However, in order to support the MIMO technology, a transmitter needs to modulate data to two independent antennae to be transmitted simultaneously. A receiver also needs to receive the data from two independent antennae at the same time and perform modulation for the data. Therefore, an RNC needs to configure related MIMO parameters for a NodeB and a terminal which transmit and receive data in the MIMO mode, so that both the NodeB and the terminal can process the data according to a specific modulation and demodulation method of the MIMO mode. Thus, normal operation of communication services can be ensured.

With the global popularization of the low carbon concept, people from all walks of life are looking for environment-friendly and energy-saving methods to save energy, to meet the requirement of improving the worsening environment and to overcome the difficulty that natural resource are becoming increasingly scarce. The communication industry is not an exception. The communication industry is actively seeking methods for energy conservation and emission reduction. By saving operation cost, the goal of low carbon operation can be achieved while coping with the fierce competition to increase revenues. However, equipment energy consumption is an important part of operation cost, and thus continuous improvement on equipment energy consumption is the main way to save energy.

FIG. 1 is a structural diagram of a Universal Terrestrial Radio Access Network (UTRAN) system according to the related art. Generally, a NodeB comprises a Base Band Unit (BBU) and a plurality of Radio Units (RU). Therefore it is an appropriate way to save the power consumption of the RUs to save the energy of a base station.

The MIMO needs two sets of RUs, each of which process data on an antenna. Currently, in a Universal Mobile Telecommunications System (UMTS), the advantage of a cell configured in the MIMO mode is the increase of the user data throughput. However, whether a terminal user of the MIMO cell is able to apply a MIMO dual-stream method for scheduling depends on the terminal capability, the data amount of the terminal user and the Channel Quality Indicator (CQI) of the terminal user. The power consumption of the RUs will be wasted if the terminal user still applies in the MIMO mode for transmission in the case that the MIMO mode cannot be adopted.

Therefore, in order to make judgment of the current communication environment rapidly, so that operations can be implemented when energy-saving conditions are satisfied to reduce energy consumption to the greatest extent, the NodeB needs to control the opening/closing of one of the RUs self-adaptively. That is the self-adaptively control of the opening/closing of one of the antennae which is usually an auxiliary antenna. In other words, the NodeB needs to control the MIMO mode switching of the cell. When there are not many User Equipments (UE) which need to communicate in the MIMO mode, or communication does not need to be performed in the MIMO mode because the traffic is low in the current cell, the cell can be switched from the MIMO mode to a non-MIMO mode. Conversely, the cell can be also switched from a non-MIMO mode to the MIMO mode.

A Control RNC (CRNC) is configured to control radio resource of a cell, specifically comprising configuration information, resource status, and radio link management etc. of a cell which belongs to the NodeB.

However, when the NodeB adjusts the MIMO mode of a cell self-adaptively, the CRNC can no longer update the MIMO mode status of the cell managed by the NodeB. This will result in inconsistent use of the current MIMO resource by the NodeB, and the UE will fail to demodulate downlink data of the NodeB. Thus communication cannot be performed normally.

SUMMARY OF THE INVENTION

The disclosure is put forward to solve the problem that after a NodeB regulate the MIMO mode of a cell self-adaptively, a CRNC cannot accurately determine the current MIMO mode status of the cell. The disclosure provides a switching method and system of a MIMO mode to solve the problem above.

A switching method of a MIMO mode is provided according to an aspect of the disclosure.

The switching method of the MIMO mode according to the disclosure comprises: a NodeB determining to perform MIMO mode switching for a cell; the NodeB sending a message to a Radio Network Controller (RNC) through a Node B Application Part (NBAP) layer of an lub port, which message carries a cell identifier of the cell and MIMO mode status information of the cell; and the RNC updating MIMO mode status of the cell by using the cell identifier and the MIMO mode status information.

Further, the NodeB sending the message to the RNC through the NBAP layer of the lub port comprises: the NodeB adding a new signaling at the NBAP layer of the lub port to send the message.

Further, the NodeB sending the message to the RNC through the NBAP layer of the lub port further comprises: the NodeB adding a new information element to a resource status indication message of the NBAP layer of the lub port to send the message.

Further, after the NodeB determines to perform the MIMO mode switching for the cell, the method further comprises: after a predetermined time period, executing an operation of sending the message.

Further, after the RNC updates the MIMO mode status of the cell, the method further comprises at least one of: according to the message, the RNC sending a message for managing a radio link to the NodeB; according to the message, the RNC sending a message for reconfiguring radio resource to a user equipment (UE) in a connected status in the cell; and according to the message, the RNC sending a message for reconfiguring resource of the cell to the NodeB.

Further, performing the MIMO mode switching for the cell comprises: switching the MIMO mode of the cell to a non-MIMO mode; or switching the non-MIMO mode of the cell to the MIMO mode.

A switching system of a MIMO mode is provided according to another aspect of the disclosure.

The switching system of the MIMO mode according to the disclosure comprises a NodeB and a Radio Network Controller (RNC), wherein the NodeB comprises: a determination module, configured to determine to perform MIMO mode switching for a cell; and a sending module, configured to send a message to the RNC through a Node B Application Part (NBAP) layer of an Iub port, wherein the message carries a cell identifier of the cell and MIMO mode status information of the cell; and the RNC comprises: an updating module, configured to update MIMO mode status of the cell by using the cell identifier and the MIMO mode status information.

Further, the sending module comprises: a first adding sub-module, configured to add a new signaling at the NBAP layer of the Iub port to send the message; and a second adding sub-module, configured to add a new information element to a resource status indication message of the NBAP layer of the Iub port to send the message.

Further, the RNC further comprises: a timing module, configured to, after the determination module determines to perform the MIMO mode switching for the cell and after a time period set by the timing module, execute an operation of sending the message.

Further, the RNC further comprises: a first sending sub-module, configured to, according to the message, send a message for managing a radio link to the NodeB; a second sending sub-module, configured to, according to the message, send a message for reconfiguring radio resource to a User Equipment (UE) in a connected status in the cell; and a third sending sub-module, configured to, according to the message, send a message for reconfiguring resource of the cell to the NodeB.

By the disclosure, the NodeB sends a message which carries the cell identifier and the MIMO mode status information to the RNC. This solution solves the problem that during the energy-saving process of the NodeB, after the NodeB regulate the MIMO mode of the cell self-adaptively, the CRNC cannot determine the current MIMO mode status of the cell. Thus, this solution ensures normal communication between the UE and the NodeB.

BRIEF DESCRIPTION OF THE DRAWINGS

The drawings illustrated herein are provided for further understanding of the disclosure and constitute a part of the application. The exemplary embodiments of the disclosure and the illustrations thereof are used for explaining the disclosure, but not for constituting an improper limitation to the disclosure. In the drawings.

DETAILED DESCRIPTION OF THE EMBODIMENTS

It should be noted that, if there is no conflict, the embodiments of the disclosure and the features in the embodiments can be combined with one another. The disclosure will be described hereinafter in detail with reference to the drawings and in combination with the embodiments.

Figure 1:
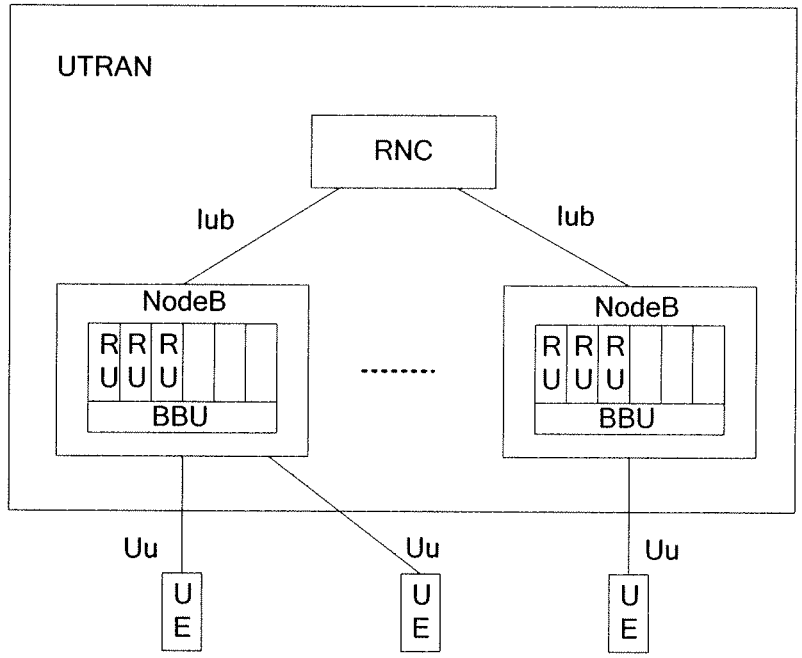
FIG. 1 is a structural diagram of a UTRAN system according to the related art.
Figure 2:
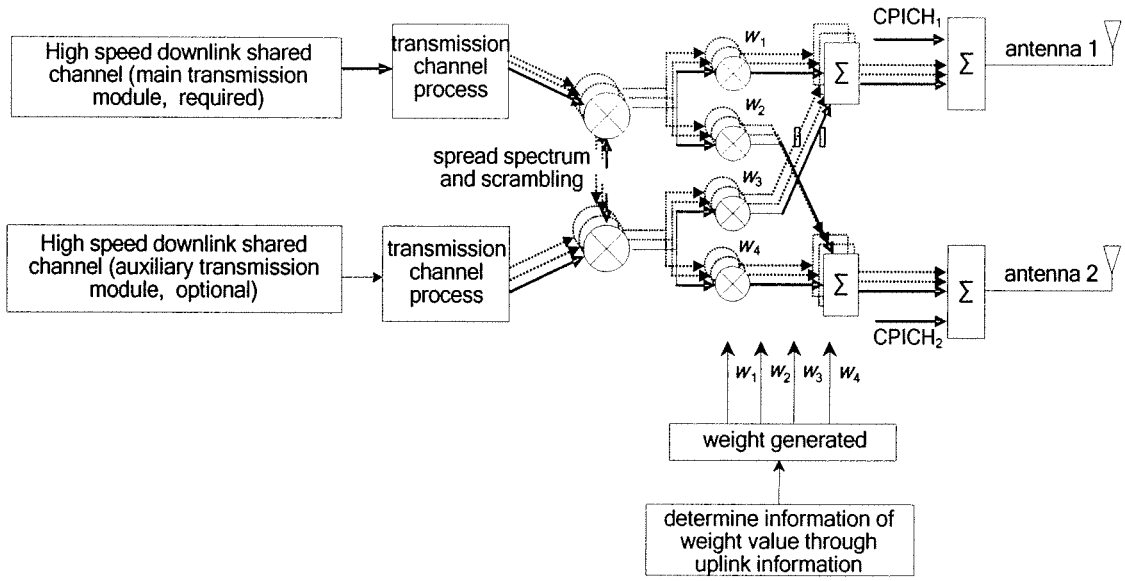
FIG. 2 is a technical principle diagram of MIMO according to the related art.
Figure 3:
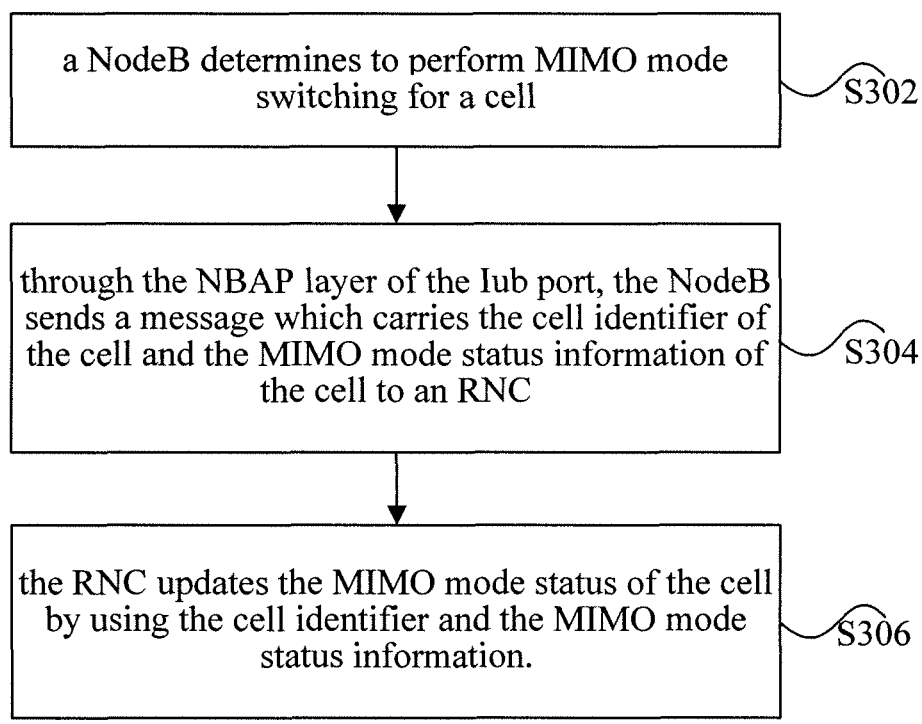
FIG. 3 is a flowchart of a switching method of a MIMO mode according to an embodiment of the disclosure.

FIG. 3 is a flowchart of a switching method of a MIMO mode according to an embodiment of the disclosure, comprising the following steps.

Step 302: a NodeB determines to perform MIMO mode switching for a cell.

Step 304: through an NBAP layer of an Iub port, the NodeB sends a message which carries the cell identifier of the cell and the MIMO mode status information of the cell to an RNC.

S306: the RNC updates the MIMO mode status of the cell by using the cell identifier and the MIMO mode status information.

In the related art, the RNC cannot determine the current MIMO mode status of the cell accurately after the NodeB regulates the MIMO mode of a cell self-adaptively. In the present embodiment of the disclosure, the cell identifier and the MIMO mode status information can be configured to indicate the current MIMO mode status of the cell. The cell identifier and the MIMO mode status information are sent to the RNC by the NodeB so as to enable the RNC to learn the current MIMO mode status of the cell, thus ensuring normal communication between a UE and the NodeB.

Preferably, the NodeB sending the message to the RNC through the NBAP layer of the Iub port further comprises that: the NodeB adds a new signaling at the NBAP layer of the Iub port to send the message.

Preferably, the NodeB sending the message to the RNC through the NBAP layer of the Iub port further comprises that: the NodeB adds a new information element to a resource status indication message of the NBAP layer of the Iub port to send the message.

It should be noted that, in the present preferred embodiment, network resource can be saved by adding the new information element to the related resource status indication message. The implementation of the method is simple.

Preferably, after the NodeB determines to perform the MIMO mode switching for the cell, an operation of sending the message is executed after a predetermined time period.

Preferably, after the RNC updates the MIMO mode status of the cell, the method comprises at least one of the following steps that: according to the message, the RNC sends a message for managing a radio link to the NodeB; according to the message, the RNC sends a message for reconfiguring radio resource to a UE in a connected status in the cell; and according to the message, the RNC sends a message for reconfiguring resource of the cell to the NodeB.

Preferably, performing the MIMO mode switching for the cell comprises: switching the MIMO mode of the cell to a non-MIMO mode; or switching the non-MIMO mode of the cell to the MIMO mode.

To help understand the embodiments above, a plurality of other preferred embodiments of the disclosure are described hereinafter.

Preferred Embodiment 1

Figure 4:
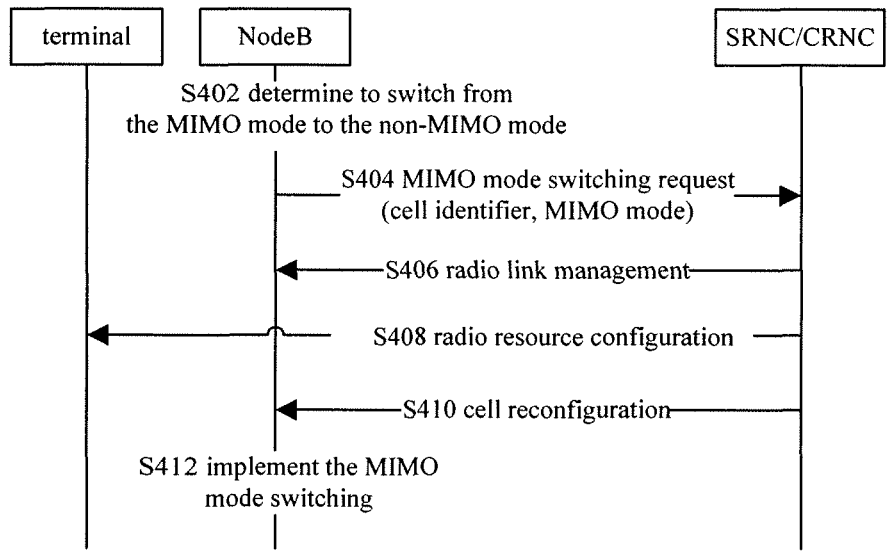
FIG. 4 is a flowchart of the first preferred embodiment of the disclosure.

FIG. 4 is a flowchart of the first preferred embodiment of the disclosure, comprising the following steps.

Step 402: a NodeB determines to switch a cell from a MIMO mode to a non-MIMO mode according to the current radio resource condition.

Step 404: the NodeB sends a MIMO mode switching request to a CRNC to which the NodeB belongs, wherein the MIMO mode switching request comprises the cell identifier and the MIMO mode status of the cell, and is sent through an NBAP layer of a Iub port.

Step 406: according to a received request from the NodeB that the cell needs to be switched from the MIMO mode to the non-MIMO mode, the RNC sends a radio link management message to the NodeB.

Step 408: according to the received request from the NodeB that the cell needs to be switched from the MIMO mode to the non-MIMO mode, the RNC sends a radio resource configuration message to a UE in a connected status in the cell, and performs related reconfiguration for the MIMO mode switching.

Step 410: according to the received request from the NodeB that the cell needs to be switched from the MIMO mode to the non-MIMO mode, the RNC sends a signaling to reconfigure the resource of the cell.

Step 412: the NodeB executes the MIMO mode switching of the cell.

Preferred Embodiment 2

Figure 5:
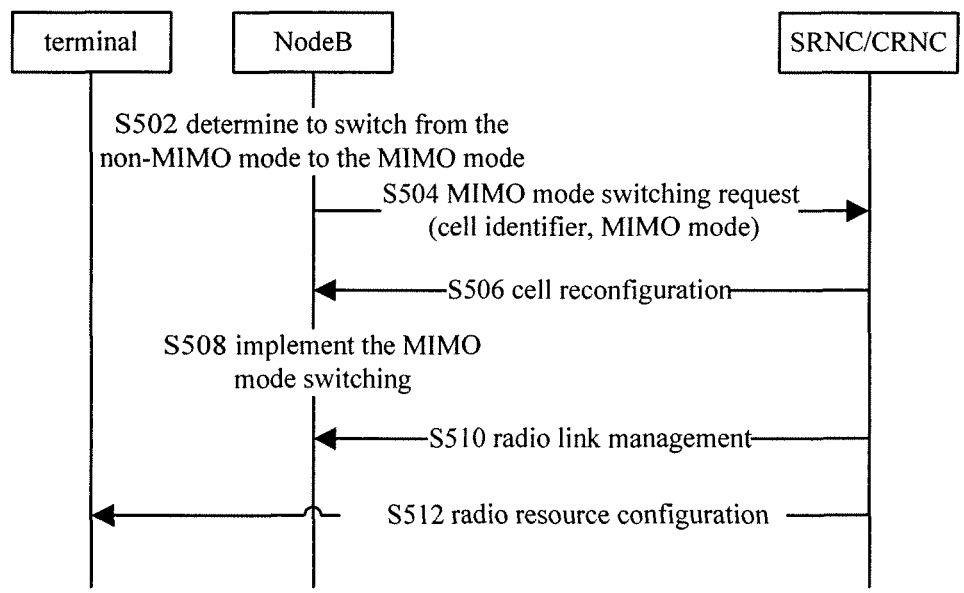
FIG. 5 is a flowchart of the second preferred embodiment of the disclosure.

FIG. 5 is a flowchart of the second preferred embodiment of the disclosure, comprising the following steps.

Step 502: a NodeB determines to switch a cell from a non-MIMO mode to a MIMO mode according to the current radio resource condition.

Step 504: the NodeB sends a MIMO mode switching request to a CRNC to which the NodeB belongs, wherein the MIMO mode switching request comprises the cell identifier and the MIMO mode status of the cell, and is sent through an NBAP layer of a Iub port.

Step 506: according to a received request from the NodeB that the cell needs to be switched from the non-MIMO mode to the MIMO mode, the RNC sends a signaling to reconfigure the resource of the cell.

Step 508: the NodeB executes the MIMO mode switching of the cell.

Step 510: according to the received request from the NodeB that the cell needs to be switched from the non-MIMO mode to the MIMO mode, the RNC sends a radio link management message to the NodeB.

Step 512: according to the received request from the NodeB that the cell needs to be switched from the non-MIMO mode to the MIMO mode, the RNC sends a radio resource configuration message to a UE in a connected status in the cell, and performs related reconfiguration for the MIMO mode switching.

Preferred Embodiment 3

Figure 6:
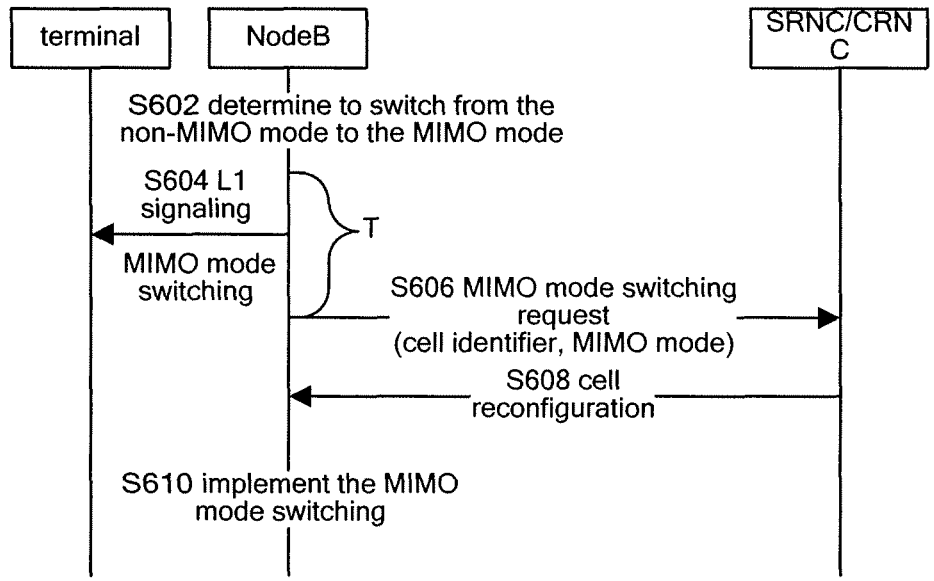
FIG. 6 is a flowchart of the third preferred embodiment of the disclosure.

FIG. 6 is a flowchart of the third preferred embodiment of the disclosure, comprising the following steps.

Step 602: a NodeB determines to switch a cell from a MIMO mode to a non-MIMO mode according to the current radio resource condition.

Step 604: the NodeB reconfigures a MIMO terminal in a connected state in the cell by a physical layer signaling (L1 signaling).

Step 606: when all L1 signaling for reconfiguring the UE is sent, or a system predetermined time or a timer expires, that is, after a time period T, the NodeB sends a MIMO mode switching request comprising the cell identifier and the MIMO mode status of the cell to a CRNC to which the NodeB belongs, wherein the MIMO mode switching request is sent through the NBAP layer of the Iub port.

Step 608: the RNC, according to a received request from the NodeB that the cell needs to be switched from the MIMO mode to the non-MIMO mode, sends a signaling to reconfigure resource of the cell.

Step 610: the NodeB executes the MIMO mode switching of the cell.

Preferred Embodiment 4

Figure 7:
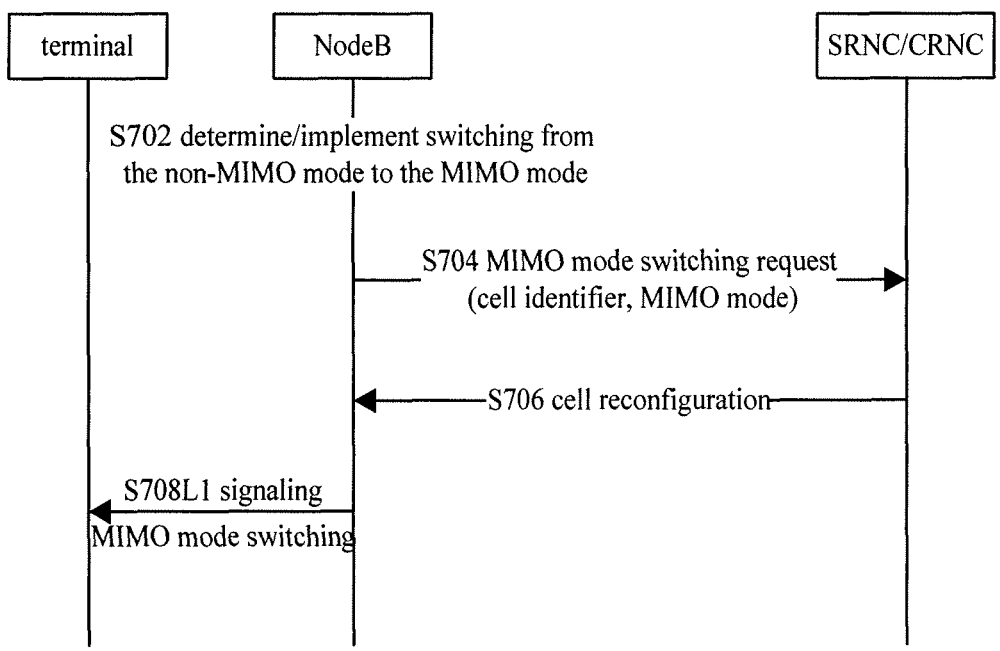
FIG. 7 is a flowchart of the fourth preferred embodiment of the disclosure.

FIG. 7 is a flowchart of the fourth preferred embodiment of the disclosure, comprising the following steps.

Step 702: a NodeB determines to switch a cell from a non-MIMO mode to a MIMO mode according to the current radio resource condition, and turns on the auxiliary antenna.

Step 704: the NodeB sends a MIMO mode switching request comprising the cell identifier and the MIMO mode status of the cell to a CRNC to which the NodeB belongs, wherein the MIMO mode switching request is sent through the NBAP layer of the Iub port.

Step 706: the RNC, according to a received request from the NodeB that the cell needs to be switched from the non-MIMO mode to the MIMO mode, sends a signaling to reconfigure resource of the cell.

Step 708: the NodeB reconfigures a MIMO terminal in a connected state in the cell to by a physical layer signaling (L1 signaling).

It should be noted that the steps illustrated in the flowcharts of the drawings may be executed in computer systems such as a group of computer-executable instructions. In addition, although logical sequences have been illustrated in the flowcharts, the steps as illustrated or described may be executed according to sequences different from those described herein in some cases.

Figure 8:
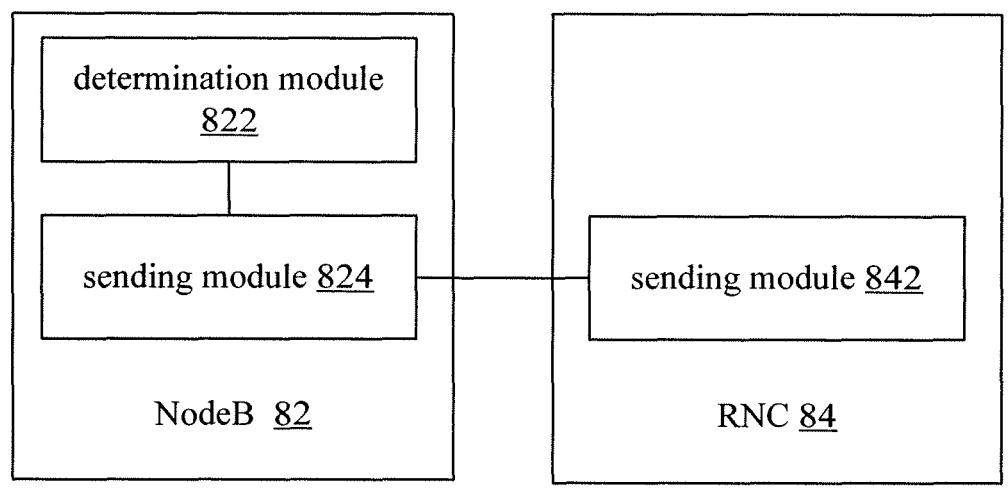
FIG. 8 is a structural block diagram of a switching system of a MIMO mode according to an embodiment of the disclosure.

A switching system of a MIMO mode is further provided by an embodiment of the disclosure. The system may be applied in implementing the above switching method of the MIMO mode. FIG. 8 is a structural block diagram of a switching system of a MIMO mode according to an embodiment of the disclosure, comprising a NodeB 82 and an RNC 84.

In the above, the NodeB 82 comprises: a determination module 822 and a sending module 824. The RNC 84 comprises an updating module 842.

The determination module 822 is configured to determine to perform MIMO mode switching for a cell. The sending module 824 is connected with the determination module 822, and is configured to send a message to the RNC through the NBAP layer of the Iub port after the determination module 822 determines to perform the MIMO mode switching for the cell, wherein the message carries the cell identifier of the cell and the MIMO mode status information of the cell. The updating module 842 is connected with the sending module 824, and is configured to update the MIMO mode status of the cell by using the cell identifier and the MIMO mode status information sent by the sending module 824.

Figure 9:
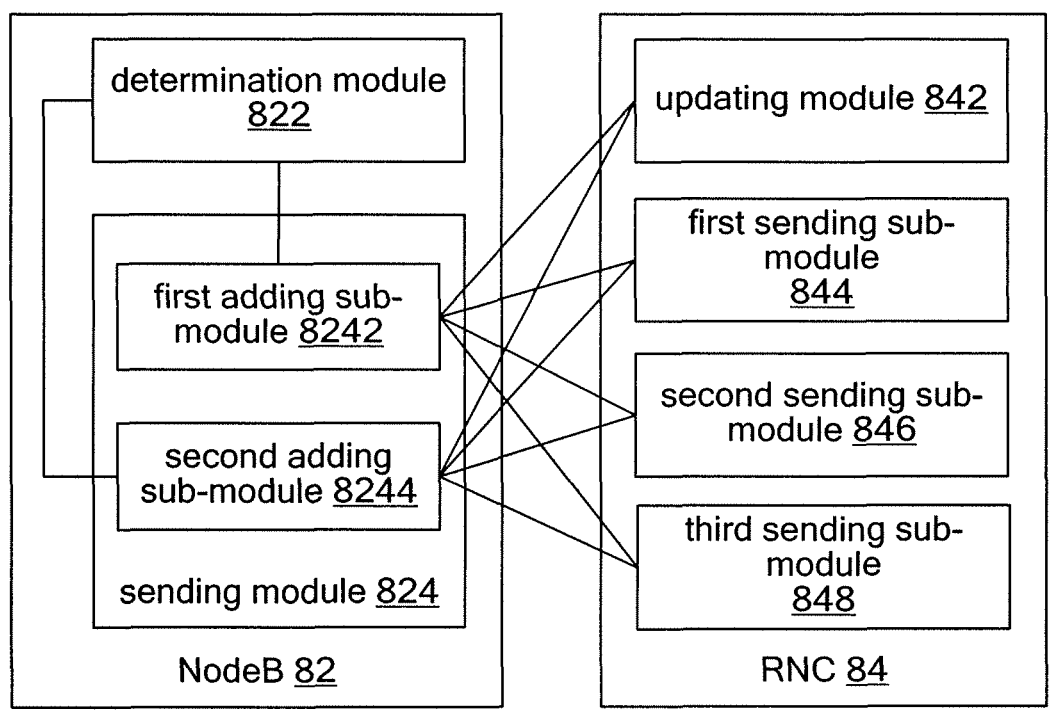
FIG. 9 is a structural block diagram of a switching system of a MIMO mode according to a preferred embodiment of the disclosure.

FIG. 9 is a structural block diagram of a switching system of a MIMO mode according to a preferred embodiment of the disclosure.

Preferably, the sending module 824 comprises: a first adding sub-module 8242, configured to add a new signaling at the NBAP layer of the Iub port to send the message, and a second adding sub-module 8244, configured to add a new information element to a resource status indication message of the NBAP layer of the Iub port to send the message.

Preferably the RNC further comprises: a timing module, connected with the determination module 822 and the sending module 824, and configured to, after the determination module 822 determines to perform the MIMO mode switching for the cell and after a time period set by the timing module, trigger the sending module 824 to execute an operation of sending the message.

Preferably, the RNC further comprises: a first sending sub-module 844, a second sending sub-module 846 and a third sending sub-module 848.

The first sending sub-module 844 is connected with the sending module 824 and is configured to, according to the message sent by the sending module 824, send a message for managing a radio link to the NodeB. The second sending sub-module 846 is connected with the sending module 824 and is configured to, according to the message sent by the sending module 824, send a message for reconfiguring radio resource to a UE in a connected status in the cell. The third sending sub-module 848 is connected with the sending module 824 and is configured to, according to the message sent by the sending module 824, send a message for reconfiguring resource of the cell to the NodeB.

The disclosure further provides a preferred embodiment which is described in detail below in combination with the technical solutions of multiple preferred embodiments above.

The switching system of the MIMO mode comprises a cell MIMO mode status switching determining device, a cell MIMO mode status and cell identifier sending device and a cell MIMO mode status and cell identifier receiving device.

The cell MIMO mode status switching determining device may be configured to determine to turn off the auxiliary antenna so that the cell is in a state in which the MIMO status is not used, or to determine to turn on the auxiliary antenna so that the cell is in a state in which the MIMO status is used.

It should be noted that when a cell supports the method for saving energy by turning off the auxiliary antenna, supports the MIMO function and is currently performing communication in the MIMO mode, but there are very few terminals which perform communication in the MIMO mode in the cell or the current traffic demand can be satisfied in the non-MIMO mode, then the energy can be saved by turning off the auxiliary antenna, that is, the cell is in the state in which the MIMO status is not used. When a cell supports the method for saving energy by turning off the auxiliary antenna, supports the MIMO function and is currently not performing communication in the MIMO mode, but the current traffic demand can hardly be satisfied in the non-MIMO mode and there are a number of terminals which support the MIMO function, then the auxiliary antenna can be turned on to satisfy the current service demand, that is, the cell is in the state in which the MIMO status is used.

The cell MIMO mode status and cell identifier sending device may correspond to the sending module 824 above, and may be configured to, after the NodeB determines to perform MIMO mode status switching for a cell, trigger an energy-saving control process immediately, and send the MIMO mode status of the cell and the cell identifier to the CRNC. And the cell MIMO mode status and cell identifier sending device may be configured to, after the NodeB determines to perform MIMO mode status switching for a cell and after a time period T (a period time set by the system or a time period of the timer), trigger an energy-saving control process and send the MIMO mode status of the cell and the cell identifier to the CRNC. And the cell MIMO mode status and cell identifier sending device may be further configured to, after the NodeB determines to perform MIMO mode status switching for a cell and opens/closes the auxiliary antenna of the cell, send the MIMO mode status of the cell and the cell identifier to the CRNC immediately.

The cell MIMO mode status and cell identifier receiving device may be configured to receive the Iub port signaling sent by the NodeB for the CRNC, which signaling comprises the identifier of a cell and the MIMO mode status of the cell.

It should be noted that if the MIMO mode status indicates that it is switched to the non-MIMO mode or that the MIMO mode is not used, then the CRNC updates the MIMO mode status information according to the cell identifier to indicate that MIMO is not used. The CRNC triggers a cell resource reconfiguration process according to needs. The CNRC triggers a radio link and radio resource management process according to needs.

Similarly, if the MIMO status indicates that it is switched to the MIMO or that the MIMO mode is used, then the CRNC updates the MIMO mode status information according to the cell identifier to indicate that MIMO is used. The CRNC triggers a cell resource reconfiguration process according to needs. The CNRC triggers a radio link and radio resource management process according to needs.

It should be noted that the switching system of the MIMO mode described in the equipment embodiments corresponds to the method embodiments above. The specific implementation process of the switching system of the MIMO mode has been described in detail in the method embodiments, and will not be repeated here.

To sum up, a switching method and system of a MIMO mode is provided according to the embodiments above of the disclosure. A NodeB sends a message which carriers the cell identifier and MIMO mode information to an RNC, to solve the problem that after a NodeB regulates the MIMO mode of a cell self-adaptively during an energy-saving process of the NodeB, a CRNC cannot determine the current MIMO mode status of the cell accurately. Thus, this solution ensures that the CRNC can determine the current MIMO status of the cell accurately, update the MIMO status of the cell currently managed by the CRNC and trigger a cell reconfiguration process that may be needed along with the MIMO mode switching. Similarly, the CRNC may provide an accurate radio link and radio resource management for a UE in the cell or a UE to be switched to the cell. Thus, this solution ensures the consistent use of the current MIMO resource by the NodeB and the UE, and ensures that the UE demodulates the downlink transmission data of the NodeB for normal communication.

Obviously, those skilled in the art should understand that the modules or steps of the disclosure may be implemented by general computing devices and centralized in a single computing device or distributed in a network consisting of multiple computing devices. Optionally, the modules or steps may be implemented by program codes executable by the computing devices, so that they may be stored in a storage device and executed by the computing device, or respectively made into integrated circuit modules or a single integrated circuit module. In this way, the disclosure is not limited to any specific combination of hardware and software.

The above is only preferred embodiments of the disclosure and should not be used to limit the disclosure. For those skilled in the art, the disclosure may have various modifications and changes. Any modifications, equivalent replacements and improvements within the spirit and principle of the disclosure shall fall within the scope of protection of the disclosure.

What is claimed is:

1. A switching method of a Multiple Input Multiple Output (MIMO) mode, comprising:
    a NodeB determining to perform MIMO mode switching for a cell self-adaptively, wherein a Radio Network Controller (RNC) does not know current MIMO mode status of the cell after the MIMO mode switching;
    the NodeB sending a message to the RNC through a Node B Application Part (NBAP) layer of an Iub port, which message carries a cell identifier of the cell and MIMO mode status information of the cell, wherein the cell identifier and the MIMO mode status information are configured to indicate the current MIMO mode status of the cell after the MIMO mode switching; and
    the RNC updating MIMO mode status of the cell by using the cell identifier and the MIMO mode status information.

2. The method according to claim 1, wherein the NodeB sending the message to the RNC through the NBAP layer of the Iub port comprises:
    the NodeB adding a new signaling at the NBAP layer of the Iub port to send the message.

3. The method according to claim 1, wherein the NodeB sending the message to the RNC through the NBAP layer of the Iub port comprises:
    the NodeB adding a new information element to a resource status indication message of the NBAP layer of the Iub port to send the message.

4. The method according to claim 1, wherein after the NodeB determines to perform the MIMO mode switching for the cell, the method further comprises: after a predetermined time period, executing an operation of sending the message.

5. The method according to claim 1, wherein after the RNC updates the MIMO mode status of the cell, the method further comprises at least one of:
    according to the message, the RNC sending a message for managing a radio link to the NodeB;
    according to the message, the RNC sending a message for reconfiguring radio resource to a User Equipment (UE) in a connected status in the cell; and
    according to the message, the RNC sending a message for reconfiguring resource of the cell to the NodeB.

6. The method according to claim 1, wherein performing the MIMO mode switching for the cell comprises:
    switching the MIMO mode of the cell to a non-MIMO mode; or
    switching the non-MIMO mode of the cell to the MIMO mode.

7. A switching system of a Multiple Input Multiple Output (MIMO) mode, comprising a NodeB and a Radio Network Controller (RNC), wherein
    the NodeB comprises:
    a determination module, configured to determine to perform MIMO mode switching for a cell self-adaptively, wherein the RNC does not know current MIMO mode status of the cell after the MIMO mode switching; and
    a sending module, configured to send a message to the RNC through a Node B Application Part (NBAP) layer of an Iub port, wherein the message carries a cell identifier of the cell and MIMO mode status information of the cell, wherein the cell identifier and the MIMO mode status information are configured to indicate the current MIMO mode status of the cell after the MIMO mode switching; and
    the RNC comprises:
    an updating module, configured to update MIMO mode status of the cell by using the cell identifier and the MIMO mode status information.

8. The system according to claim 7, wherein the sending module comprises:
    a first adding sub-module, configured to add a new signaling at the NBAP layer of the Iub port to send the message; and
    a second adding sub-module, configured to add a new information element to a resource status indication message of the NBAP layer of the Iub port to send the message.

9. The system according to claim 7, wherein the RNC further comprises:
    a timing module, configured to, after the determination module determines to perform the MIMO mode switching for the cell and after a time period set by the timing module, execute an operation of sending the message.

10. The system according to claim 7, wherein the RNC further comprises:
    a first sending sub-module, configured to, according to the message, send a message for managing a radio link to the NodeB;
    a second sending sub-module, configured to, according to the message, send a message for reconfiguring radio resource to a User Equipment (UE) in a connected status in the cell; and
    a third sending sub-module, configured to, according to the message, send a message for reconfiguring resource of the cell to the NodeB.

11. The method according to claim 2, wherein performing the MIMO mode switching for the cell comprises:
    switching the MIMO mode of the cell to a non-MIMO mode; or
    switching the non-MIMO mode of the cell to the MIMO mode.

12. The method according to claim 3, wherein performing the MIMO mode switching for the cell comprises:
    switching the MIMO mode of the cell to a non-MIMO mode; or
    switching the non-MIMO mode of the cell to the MIMO mode.

13. The method according to claim 4, wherein performing the MIMO mode switching for the cell comprises:
    switching the MIMO mode of the cell to a non-MIMO mode; or
    switching the non-MIMO mode of the cell to the MIMO mode.

14. The method according to claim 5, wherein performing the MIMO mode switching for the cell comprises:
    switching the MIMO mode of the cell to a non-MIMO mode; or
    switching the non-MIMO mode of the cell to the MIMO mode.

* * * * *

UNITED STATES PATENT AND TRADEMARK OFFICE
CERTIFICATE OF CORRECTION

PATENT NO. : 8,768,328 B2  Page 1 of 1
APPLICATION NO. : 13/698973
DATED : July 1, 2014
INVENTOR(S) : Zhang et al.

It is certified that error appears in the above-identified patent and that said Letters Patent is hereby corrected as shown below:

In the claims:
Claim 7, Col. 9, Line 62, please change [[Tub]] to --Iub--

Signed and Sealed this
Sixteenth Day of September, 2014

Michelle K. Lee
*Deputy Director of the United States Patent and Trademark Office*